No. 747,760. PATENTED DEC. 22, 1903.
J. M. PHILBRICK.
COTTON HARVESTER.
APPLICATION FILED APR. 4, 1903.
NO MODEL. 5 SHEETS—SHEET 1.
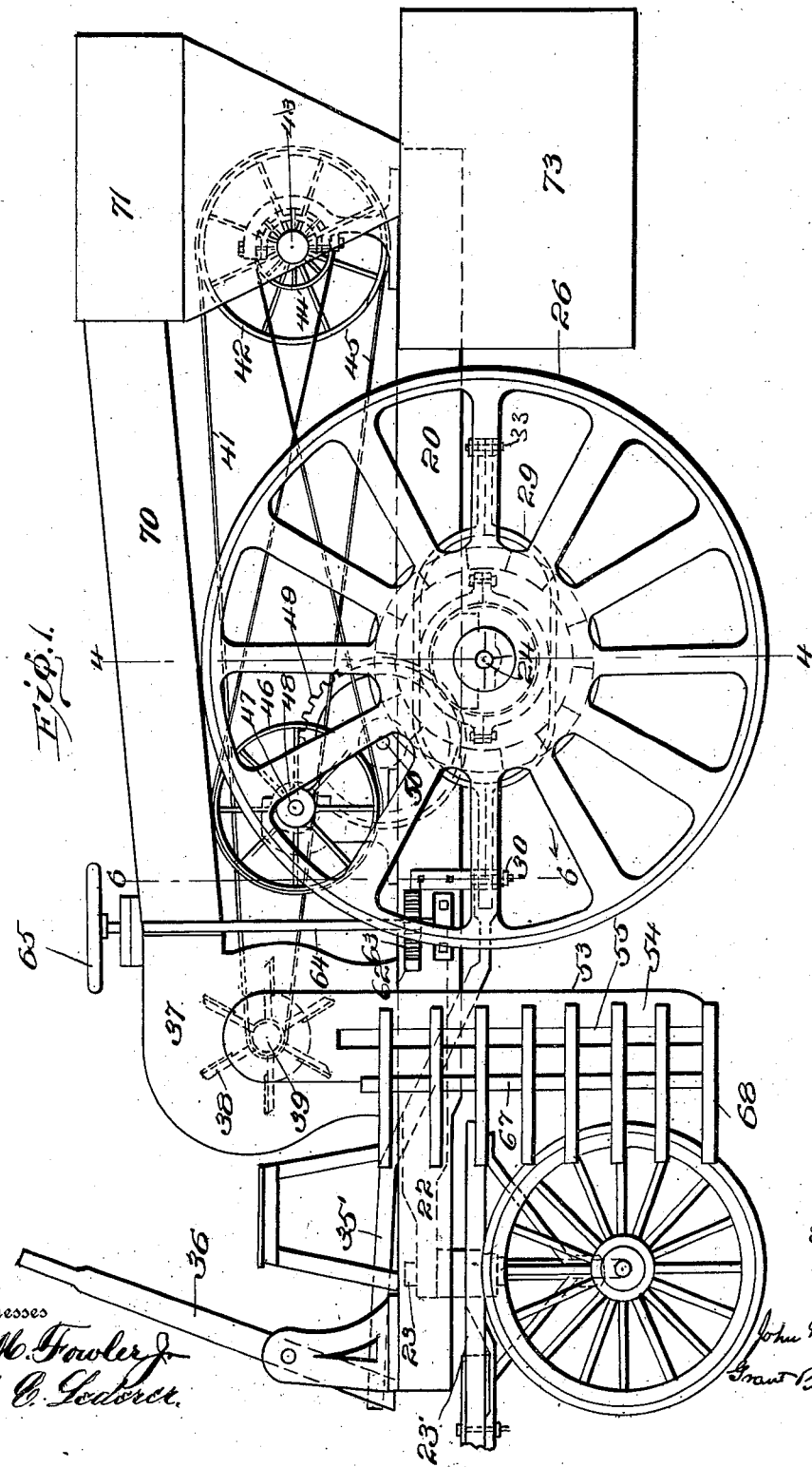

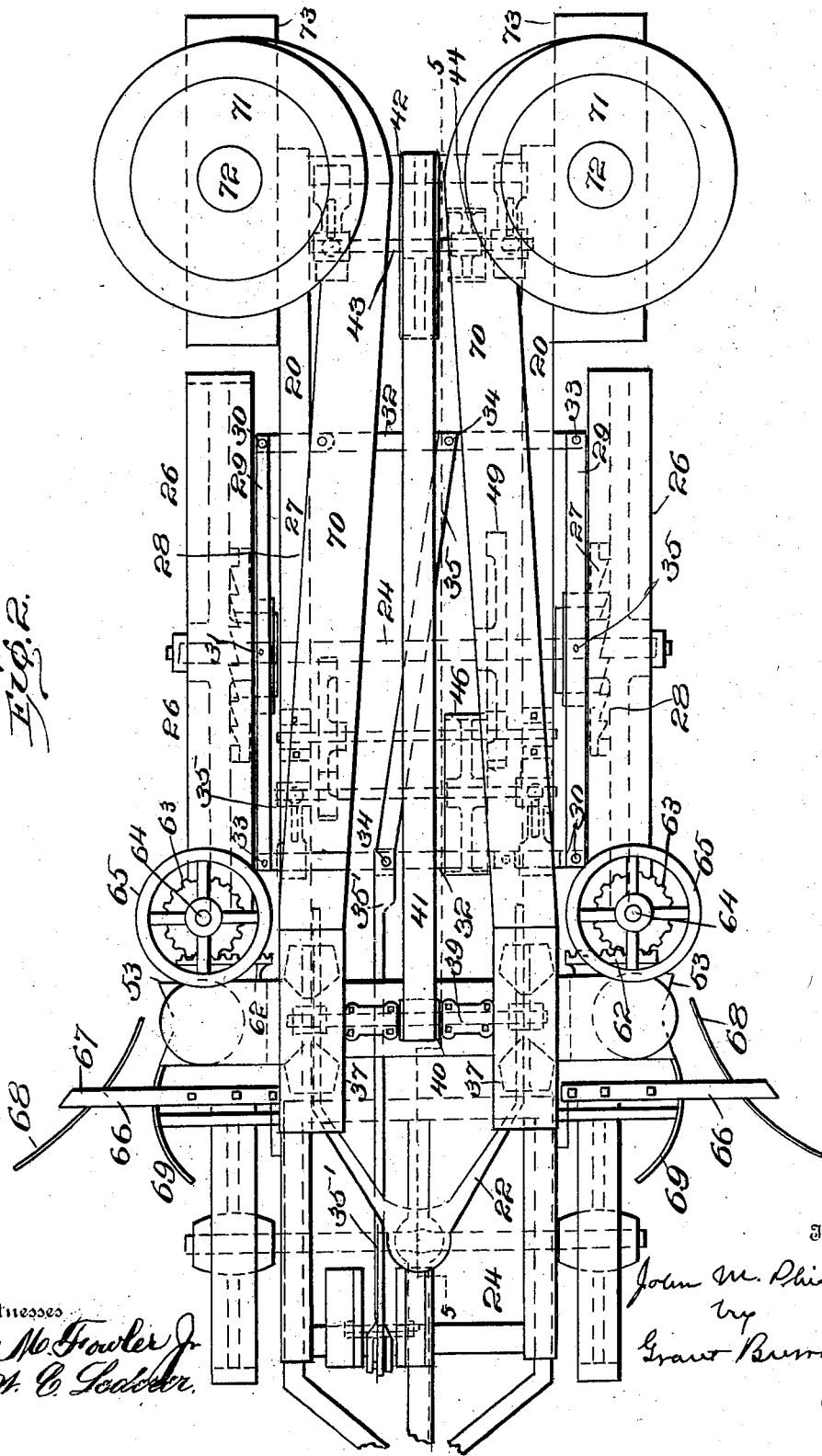

No. 747,760. PATENTED DEC. 22, 1903.
J. M. PHILBRICK.
COTTON HARVESTER.
APPLICATION FILED APR. 4, 1903.
NO MODEL. 5 SHEETS—SHEET 3.
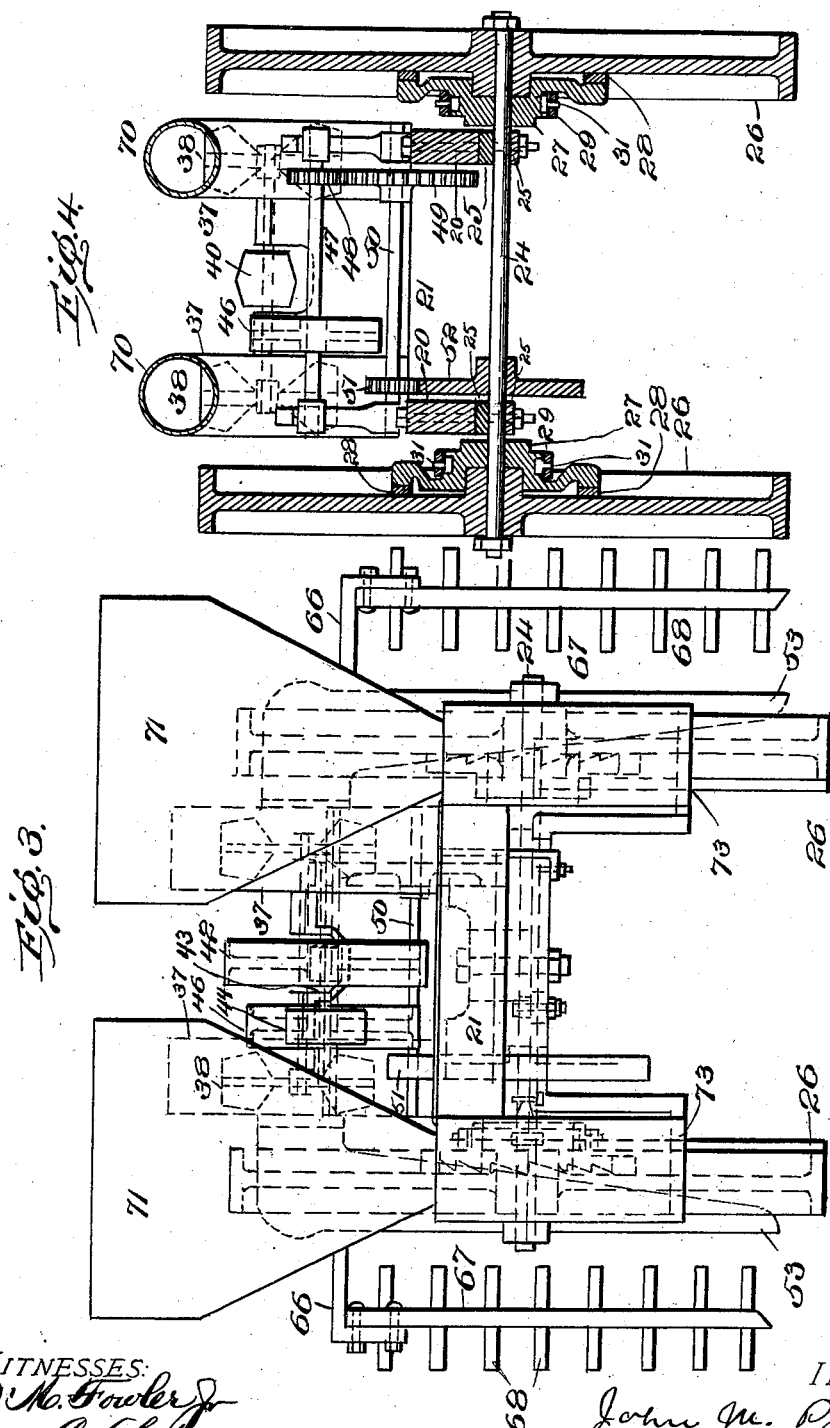
WITNESSES:
J. M. Fowler Jr.
W. C. Sedorer.
INVENTOR
John M. Philbrick
BY
Grant Burroughs
Attorney No. 747,760. PATENTED DEC. 22, 1903.
J. M. PHILBRICK.
COTTON HARVESTER.
APPLICATION FILED APR. 4, 1903.
NO MODEL. 5 SHEETS—SHEET 4.
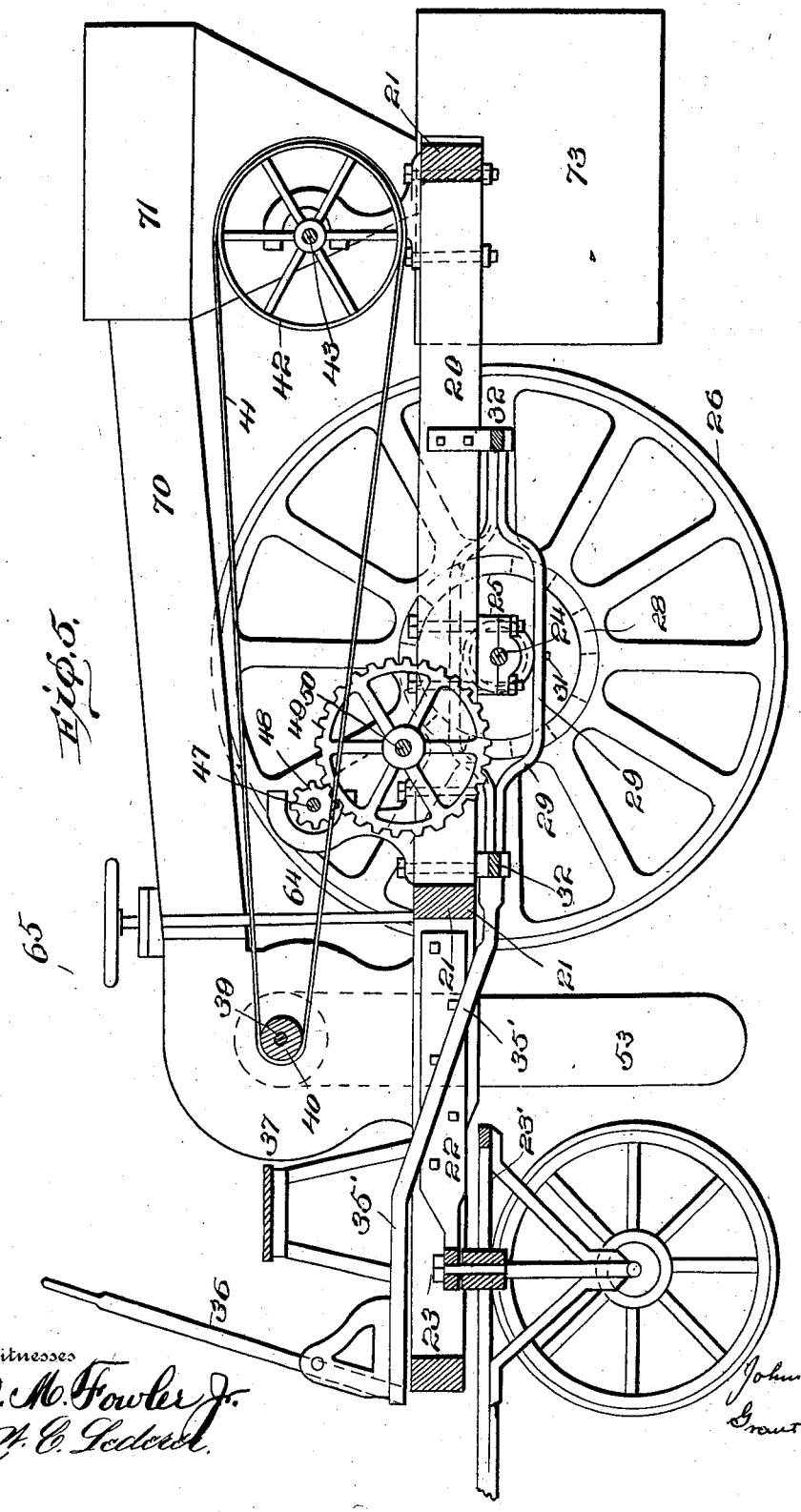

No. 747,760. PATENTED DEC. 22, 1903.
J. M. PHILBRICK.
COTTON HARVESTER.
APPLICATION FILED APR. 4, 1903.
NO MODEL. 5 SHEETS—SHEET 5.
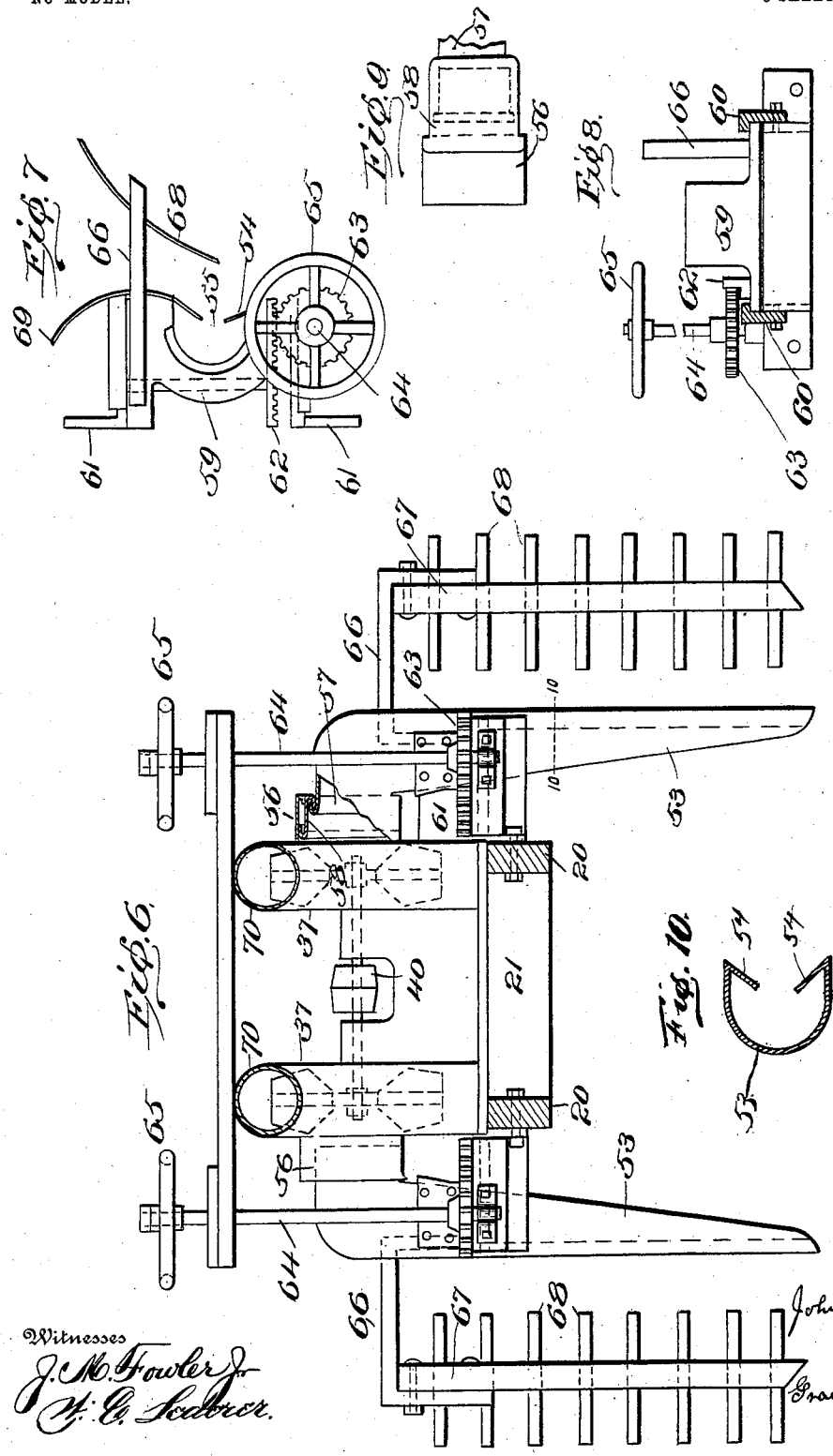

No. 747,760. Patented December 22, 1903.

UNITED STATES PATENT OFFICE.

JOHN M. PHILBRICK, OF MACON, GEORGIA.

COTTON-HARVESTER.

SPECIFICATION forming part of Letters Patent No. 747,760, dated December 22, 1903.

Application filed April 4, 1903. Serial No. 151,078. (No model.)

*To all whom it may concern:*

Be it known that I, JOHN M. PHILBRICK, a citizen of the United States, and a resident of Macon, in the county of Bibb and State of Georgia, have invented certain new and useful Improvements in Cotton-Harvesters, of which the following is a full, clear, and exact description, such as will enable those skilled in the art to which it appertains to make and use the same, reference being had to the accompanying drawings, forming a part of this specification.

The invention relates to improvements in cotton-harvesters of that description in which a blast of air is employed in removing the ripened bolls from the plants.

It consists in the novel construction, combination, and arrangement of parts, such as will be hereinafter fully described, and pointed out in the appended claims.

In the drawings, in which similar reference characters designate corresponding parts, Figure 1 is a side elevation of a machine embodying the invention. Fig. 2 is a plan view. Fig. 3 is a rear elevation. Fig. 4 is a transverse sectional view on the line 4 4 of Fig. 1. Fig. 5 is a longitudinal sectional view on the line 5 5 of Fig. 2. Fig. 6 is a transverse sectional view on the line 6 6 of Fig. 1. Fig. 7 is a detail plan view of the adjusting mechanism of the suction-tubes. Fig. 8 is a detail sectional view showing the same. Fig. 9 is a detail sectional view of the telescopic joint between the suction-tube and the fan-box. Fig. 10 is an enlarged detail sectional view on the line 10 10 of Fig. 6, showing one of the suction-tubes.

The frame carrying the several parts of the machine is mounted on carrying-wheels adapted to the purpose, and it may be of any construction suitable to the purpose. In the present instance it consists of the longitudinal pieces 20, connected by the transverse pieces 21. Secured between the forward ends of the longitudinal pieces is the yoke 22, through the angle of which passes the king-bolt 23, pivoting the main frame to the platform 23', to the under side of which the forward carrying-wheels are attached. To this platform is connected the usual draft apparatus. On the forward end of the main frame is placed the usual operator's seat. The size of the forward wheels is such as to permit them to pass under the main frame to facilitate the turning of the machine.

The main driving-shaft 24 is journaled in bearings 25, secured to the under sides of the longitudinal pieces 20 of the frame. The ends of the shaft project beyond the bearings and have journaled thereon the traction-wheels 26. Toothed clutch members 27 are splined on the main driving-shaft and are adapted to engage with similar members 28, secured to the traction-wheels. The formation of the teeth of the clutch mechanism is such as to permit an engagement between the members only when the machine is moved in a forward direction. By moving the clutch members into engagement with each other motion can be conveyed from the traction-wheels to the driving-shaft. Mechanism is provided for moving the clutch members into and out of engagement. On opposite sides of the machine are the bifurcated levers 29, pivoted at their opposite ends, as at 30, to the longitudinal pieces 20 of the frame. The free ends of the levers extend in opposite directions. Between the members of the bifurcations of these levers are pivoted by the pins 31 the clutch members 27, splined on the main driving-shaft. To the free ends of the bifurcated levers are pivoted the outer ends of the arms 32, hinged to the longitudinal pieces 20, as at 33. Each of the arms 32 is in two parts, connected by a hinge-joint, as at 34. A rod 35 connects the two arms 32 and is connected by the rod 35' with the operating-lever 36, mounted on the forward end of the main frame adjacent to the operator's seat. By means of this lever 36 and the connecting-rods the jointed arms 32 can be moved so as to break their joints, and thereby swing the free ends of the bifurcated levers inwardly to move the clutch members splined on the driving-shaft out of engagement with the clutch members attached to the traction-wheels. By moving the arms to straighten them out at their joints the bifurcated levers can be moved to cause the clutch members to engage with each other so, that motion will be conveyed from the traction-wheels to the driving-shaft when the machine moves forward. By the foregoing mechanism the operative parts of the machine can be controlled.

In an elevated position on the forward part of the frame of the machine and on opposite sides of the same are mounted the fan-boxes 37, in which are placed the rotary blowers 38. The latter are carried by the shaft 39, journaled in suitable bearings. On the shaft is the pulley 40, over which passes the belt 41, leading from the pulley 42 on the shaft 43, journaled in suitable bearings placed in the rear part of the machine. On the shaft 43 is the pulley 44, and leading from the latter is the belt 45, passing over the pulley 46 on the shaft 47. With the spur-gear 48 on the shaft 47 engages the gear 49 on the shaft 50, and the latter is driven by the spur-gear 51 on the same engaging with the gear 52 on the main driving-shaft 24. By means of this intermediate mechanism the rotary blowers can be driven at the rate of speed required for the purpose.

Opening into each fan-box 37 opposite to the rotary blower contained therein is a suction-tube 53, leading from a point near the surface of the ground. The face 54 of this tube for most of its length is concave and is provided with a longitudinal slot 55. The tube is also comparatively shallow at its lower end and gradually increases in size toward its upper end. The connection between the suction-tube and the fan-box is a telescopic joint comprising the sections 56 and 57 of the fan-box and the tube, respectively, and the intermediate section 58. The registering ends of these sections are turned inwardly to form a tight fit and also to engage with each other to prevent a separation of the sections when the joint is extended.

A carriage 59 supports each suction-tube 53 and is adjustably mounted in the ways 60, projecting outwardly from the machine and secured to the supports 61, attached to the longitudinal pieces 20 of the frame. On the carriage is the rack 62, with which engages the spur-gear 63 on the shaft 64, journaled in suitable bearings. On the upper end of this shaft is the hand-wheel 65, by means of which the carriage can be adjusted to adapt the suction-tube to its work.

On the carriage 59 is the bracket 66, to the outer end of which is secured the standard 67. The latter is carried outside of the suction-tube and somewhat in advance of the same. Fingers 68, of spring metal or other resilient material, are secured transversely to the standard. These fingers are placed at such an angle as to guide any plants they come in contact with as the machine progresses toward the concave face of the suction-tube. Secured to the suction-tube in front of the same is the sheet-metal wing 69, adapted to coöperate with the spring-fingers 68 in guiding the plants to the concave face of the suction-tube.

From the upper part of each one of the fan-boxes 37 a conveyer-pipe 70 leads to a dust-separator 71, mounted on the rear part of the machine. The separator is shaped somewhat like the frustum of an inverted cone, with a cylindrical base, and the conveyer-pipe enters the cylindrical base tangentially. In the top of the separator is an opening 72 to permit the escape of the compressed air and the dust. The lower end of the separator connects with a receptacle 73, adapted to receive the cotton. The receptacle is provided with a suitable door to permit the removal of the cotton collected therein.

It is to be observed that the arrangement of the several parts of the machine is such as to provide a longitudinal passage-way through the same, so as to permit the machine to be propelled over a row of plants without affecting the latter.

In operation the machine travels so that the longitudinal passage-way through the same passes over a central row of plants with the traction-wheels and other mechanism in the intervals between the central row and the two adjacent rows. While passing through the machine this central row is not affected in any way. The suction-tubes, which have been adjusted to suit the widths between the rows, move in contact with the inner sides of the two adjacent rows. As the machine moves forward the fingers 68 and the wings 69 engage the plants of the two outer rows and press them toward the concave faces of the suction-tubes. As the plants pass the longitudinal openings in the faces of the suction-tubes the ripe cotton on the inner sides of the plants is drawn by the blasts of air created by the rotary blowers into the fan-boxes. From the latter the cotton is carried by the air-blasts through the conveyer-pipes 70 into the upper ends of the separators 71. As the conveyer-pipes enter the separators tangentially the cotton will receive a rotary motion around the sides of the separators and will gradually work downwardly into the receptacles 73, from which it is taken at suitable intervals. While in the separators the air leaves the cotton and escapes through the openings 72 and carries with it the dust that has separated from the cotton. It is obvious that the machine can be operated to pick the cotton from the central row of plants and also from the outer sides of the two adjacent rows.

While the herein-described embodiment of the device is the preferred one, yet it can be departed from to a considerable extent without departing from the spirit of the invention.

Having thus described my invention, what I claim, and desire to secure by Letters Patent, is—

1. In a cotton-harvester, laterally-movable carriages, means for independently adjusting said carriages relatively to each other, suction-tubes mounted on said carriages and adjusted by the same to accommodate rows of plants at various distances apart, and means for exhausting air from said tubes.

2. In a cotton-harvester, a suction-tube provided with a concave face and having a longitudinal opening in said face, means for drawing air into said tube through said opening, and a wing projecting from said tube in advance of said face.

3. In a cotton-harvester, a suction-tube provided with a concave face and having a longitudinal opening in said face, means for drawing air into said tube through said opening, a wing projecting from said tube in advance of said face, and guide-fingers placed opposite to said wing.

4. In a cotton-harvester, a fan-box, a blower mounted in said fan-box, a laterally-movable carriage, means for laterally adjusting said carriage relatively to said fan-box, a suction-tube mounted on said carriage and connected with said fan-box and provided with a longitudinal opening, and means for guiding plants to said opening.

5. In a cotton-harvester, a fan-box, a blower mounted in said fan-box, a laterally-movable carriage, means for laterally adjusting said carriage relatively to said fan-box, a suction-tube mounted on said carriage and provided with a longitudinal opening, a telescopic joint connecting said tube with said fan-box, and means for guiding plants to said opening.

6. In a cotton-harvester, a fan-box, a blower mounted in said fan-box, a laterally-movable carriage, means for laterally adjusting said carriage relatively to said fan-box, a suction-tube mounted on said carriage and connected with said fan-box and provided with a concave face and having a longitudinal opening in said face, a wing projecting from said tube in advance of said face, and guide-fingers supported by said carriage opposite to said wing.

7. In a cotton-harvester, a fan-box, a blower mounted in said fan-box, a laterally-movable carriage, means for laterally adjusting said carriage relatively to said fan-box, a suction-tube mounted on said carriage and provided with a concave face and having a longitudinal opening in said face, a wing projecting from said tube in advance of said face, guide-fingers supported by said carriage opposite to said wing, and a telescopic joint connecting said tube with said fan-box.

8. In a cotton-harvester, a fan-box, a blower mounted in said fan-box, a carriage adjustable relatively to said fan-box, a suction-tube mounted on said carriage and provided with a concave face and having a longitudinal opening in said face, a telescopic joint connecting said tube with said fan-box, a wing projecting from said tube in advance of said opening, and guide-fingers supported by said carriage opposite to said wing.

9. In a cotton-harvester, a fan-box, a blower mounted therein, a laterally-movable carriage, means for laterally adjusting said carriage relatively to said fan-box, a suction-tube mounted on said carriage and connected with said fan-box, means for guiding plants to said tube, a dust-separator, a conveyer-pipe leading from said fan-box to said separator, and a receptacle connected with said separator.

10. In a cotton-harvester, a fan-box, a blower mounted therein, a laterally-movable carriage, means for laterally adjusting said carriage relatively to said fan-box, a suction-tube mounted on said carriage and provided with a concave face and having a longitudinal opening in said face, a wing projecting from said tube in advance of said face, guide-fingers placed on said carriage opposite to said wing, a telescopic joint connecting said tube with said fan-box, a dust-separator, a conveyer-pipe leading from said fan-box to said separator, and a receptacle connected with said separator.

11. In a cotton-harvester, a fan-box, a blower mounted therein, a laterally-movable carriage, means for laterally adjusting said carriage relatively to said fan-box, a suction-tube mounted on said carriage and provided with a concave face and having a longitudinal opening in said face, a wing projecting from said tube in advance of said face, guide-fingers placed on said carriage opposite to said wing, a telescopic joint connecting said tube with said fan-box, a dust-separator having a cylindrical portion, a conveyer-pipe leading from said fan-box to said cylindrical portion and entering the same at a tangent, and a receptacle connected with said separator.

In testimony whereof I hereunto affix my signature in the presence of two witnesses.

JOHN M. PHILBRICK.

Witnesses:
HENDLEY V. NAPIER, Jr.,
ROBT. A. NISBET.